(12) United States Patent
Wang (10) Patent No.: US 12,405,715 B2
(45) Date of Patent: *Sep. 2, 2025

(54) PAGE DISPLAY METHOD, ELECTRONIC DEVICE AND STORAGE MEDIUM

(71) Applicant: BEIJING XIAOMI MOBILE SOFTWARE CO., LTD., Beijing (CN)

(72) Inventor: Yaxin Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,653

(22) Filed: Oct. 17, 2023

(65) Prior Publication Data

US 2024/0045583 A1 Feb. 8, 2024

Related U.S. Application Data

(63) Continuation of application No. 17/949,179, filed on Sep. 20, 2022, now Pat. No. 11,847,305.

(30) Foreign Application Priority Data

Jun. 27, 2022 (CN) .......................... 202210745582.0

(51) Int. Cl.
*G06F 3/048* (2013.01)
*G06F 3/0481* (2022.01)
(Continued)

(52) U.S. Cl.
CPC ........ *G06F 3/04845* (2013.01); *G06F 3/0481* (2013.01); *G06F 3/04847* (2013.01); *G06F 2203/04803* (2013.01)

(58) Field of Classification Search
CPC .............. G06F 3/04845; G06F 3/0481; G06F 3/04847; G06F 2203/04803; G06F 3/04842; G06F 9/451; G06F 3/04812
See application file for complete search history.

(56) References Cited

U.S. PATENT DOCUMENTS 11,709,688 B2 * 7/2023 Chen ................... G06F 3/04855
715/787
2016/0334989 A1 * 11/2016 Liu ..................... G06F 3/04886
(Continued)

FOREIGN PATENT DOCUMENTS

CN 108279835 A * 7/2018 ........... G06F 3/0481
CN 108366301 A * 8/2018 ......... H04N 21/4316
(Continued)

OTHER PUBLICATIONS

Extended European Search Report issued in Application No. 22198213.5, dated Jun. 21, 2023,(9p).

*Primary Examiner* — Rashawn N Tillery
(74) *Attorney, Agent, or Firm* — Arch & Lake LLP (57) ABSTRACT

A page display method includes: determining a target sub-page to be switched into a freeform window mode from a plurality of sub-pages of a target application in an activity-embedding mode in response to a dragging operation; obtaining first display configuration information of a first display window for displaying the target sub-page in the activity-embedding mode; obtaining second display configuration information in the freeform window mode by modifying the first display configuration information according to the freeform window mode; and displaying the target sub-page in a second display window in the freeform window mode according to the second display configuration information.

20 Claims, 6 Drawing Sheets

(51) Int. Cl.
  *G06F 3/04845*    (2022.01)
  *G06F 3/04847*    (2022.01)

(56) References Cited

U.S. PATENT DOCUMENTS

| | | | |
|---|---|---|---|
| 2017/0195613 A1* | 7/2017 | Yang | H04N 5/268 |
| 2017/0300227 A1* | 10/2017 | Wang | G06F 3/0481 |
| 2017/0344192 A1* | 11/2017 | Liu | G06F 3/04845 |
| 2018/0246634 A1 | 8/2018 | Suh et al. | |
| 2018/0284948 A1* | 10/2018 | Hao | G06F 3/0481 |
| 2018/0285730 A1* | 10/2018 | Zhao | H04L 67/535 |
| 2019/0073123 A1* | 3/2019 | Yang | G06F 3/0488 |
| 2019/0332232 A1* | 10/2019 | Lu | G06F 40/205 |
| 2020/0210048 A1* | 7/2020 | Pei | G06F 40/30 |
| 2020/0401281 A1* | 12/2020 | Shu | G06F 1/1694 |
| 2020/0409512 A1* | 12/2020 | Jing | G06F 3/0481 |
| 2021/0042002 A1 | 2/2021 | Lee et al. | |
| 2021/0064323 A1* | 3/2021 | Fu | H04N 21/41265 |
| 2021/0191581 A1* | 6/2021 | Lin | G06F 3/0488 |
| 2021/0191741 A1* | 6/2021 | Li | G06F 3/017 |
| 2022/0147196 A1 | 5/2022 | Kim et al. | |
| 2022/0197961 A1* | 6/2022 | Baek | G06N 3/044 |
| 2022/0236837 A1* | 7/2022 | Zhu | G06F 9/543 |
| 2023/0152945 A1* | 5/2023 | Ma | G06F 3/04845 715/764 |

FOREIGN PATENT DOCUMENTS

| | | | | |
|---|---|---|---|---|
| CN | 108595665 A | * | 9/2018 | ......... G06F 16/9558 |
| CN | 109885223 A | | 6/2019 | |
| CN | 110515579 A | * | 11/2019 | ........... G06F 3/0481 |
| CN | 111125480 A | * | 5/2020 | |
| CN | 111399720 A | * | 7/2020 | ........... G06F 3/0481 |
| CN | 112579962 A | * | 3/2021 | ........... G06F 16/958 |
| CN | 112130742 A | | 4/2022 | |
| CN | 111552426 A | | 5/2022 | |
| WO | WO-2015106519 A1 | * | 7/2015 | ........... G06F 3/0484 |
| WO | WO-2017071424 A1 | * | 5/2017 | ........... G06F 3/0481 |
| WO | WO-2019174546 A1 | * | 9/2019 | ........... G06F 3/0482 |
| WO | WO-2021035884 A1 | * | 3/2021 | ........... G06F 3/0481 |
| WO | 2021158068 A1 | | 8/2021 | |
| WO | WO-2021227770 A1 | * | 11/2021 | ........... G06F 3/0481 |
| WO | 2022062898 A1 | | 3/2022 | |
| WO | WO-2024109198 A1 | * | 5/2024 | |

* cited by examiner

PAGE DISPLAY METHOD, ELECTRONIC DEVICE AND STORAGE MEDIUM

CROSS-REFERENCE TO RELATED APPLICATIONS

This application is a continuation application of U.S. patent application Ser. No. 17/949,179, filed Sep. 20, 2022, which is based upon and claims priority to Chinese Patent Application No. 202210745582.0, filed with the State Intellectual Property Office of P. R. China on Jun. 27, 2022, the entire content of both of which is incorporated herein by reference for all purposes.

TECHNICAL FIELD

The present disclosure generally relates to a technical field of computer technology, and more particularly, to a page display method, a page display device, an electronic device and a storage medium.

BACKGROUND

At present, various application programs may be installed in a terminal device to meet various work and life needs. In order to meet personalized needs of users, pages of the application program need to be displayed in different display modes. The display modes include an activity-embedding mode, a picture-in-picture display mode, a freeform window mode, and the like. It is important to realize the switch of the page between different display modes to better meet the personalized needs.

SUMMARY

In the present disclosure, a page display method, a page display device, an electronic device and a storage medium are provided.

According to a first aspect of the present disclosure, a page display method is provided. The page display method includes: in response to a dragging operation of a target sub-page, switching, by a page display device, the target sub-page into a freeform window mode, in which the target sub-page is from a plurality of sub-pages in a target application, and the target application is in an activity-embedding mode; and determining, by the page display device, at least one sub-page of the plurality of sub-pages other than the target sub-page as a background.

According to a second aspect of the present disclosure, an electronic device is provided. The electronic device includes at least one processor, and a memory communicatively connected to the at least one processor and having stored therein instructions that are executable by the at least one processor. The instructions, when executed by the at least one processor, cause the at least one processor to execute the method according to the first aspect of the present disclosure.

According to a third aspect of the present disclosure, a non-transitory computer-readable storage medium is provided. The non-transitory computer-readable storage medium has stored therein computer instructions that, when executed by a computer, cause the computer to perform the method according to the first aspect of the present disclosure.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Terms used in the present disclosure are merely for describing specific examples and are not intended to limit the present disclosure. The singular forms "one," "the," and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first," "second," "third," and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while," or "in response to . . . , it is determined that."

At present, large-screen terminal devices will be used more and more, and new functions for the large-screen terminal device will also become mainstream. For example, the large-screen terminal device may display a page of an application program in an activity-embedding mode, in a freeform window mode (a small window suspend mode), in a picture-in-picture display mode and so on. In order to better meet user's personalized needs, the display of the page needs to be witched between different display modes. However, in practice, the switch of the page of the application program from the activity-embedding mode to the freeform window mode needs to relay on a third-party application program to adaptively set a split minimum width (split Min Width) to determine the number of the display windows, so that the number of the display windows in the freeform window mode cannot be consistent, resulting in a truncation phenomenon of contents in the display window.

In view of the above-mentioned problems, the present disclosure provides a page display method, a page display device, an electronic device and a storage medium.

The page display method, the page display device, the electronic device, and the storage medium according to examples of the present disclosure will be described below with reference to the accompanying drawings.

Figure 1:
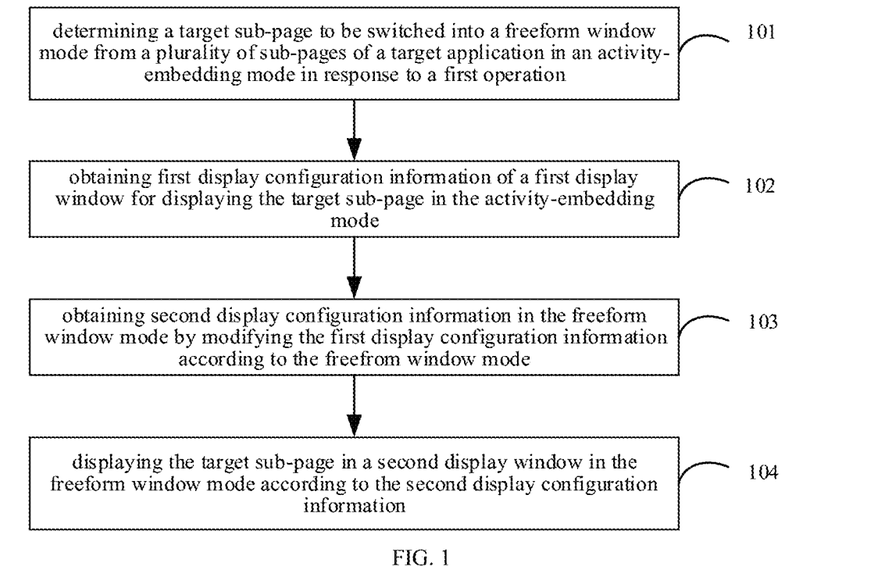
FIG. 1 is a schematic flow chart of a page display method according to an example of the present disclosure.

FIG. 1 is a schematic flow chart of a page display method according to an example of the present disclosure. Examples of the present disclosure will be illustrated with reference to a case where the page display method is configured in a page display device. The page display device may be applied to any electronic device to enable the electronic device to perform a page display function.

The electronic device may be any device having a computing capability, such as a personal computer (PC for short), a mobile terminal and so on. The mobile terminal may be hardware devices having various operating systems, touch screens and/or display screens, such as mobile phones, tablet computers, personal digital assistants, wearable devices and the like.

As shown in FIG. 1, the page display method includes step 101 to step 104 as follows.

In step 101, a target sub-page to be switched into a freeform window mode is determined from a plurality of sub-pages of a target application in an activity-embedding mode in response to a first operation.

In examples of the present disclosure, in a case where the target application is displayed by the plurality of sub-pages in the activity-embedding mode, in response to the first operation, the target sub-page to be switched into the freeform window mode is determined from the plurality of sub-pages of the target application in the activity-embedding mode. The first operation may be a sliding operation, a clicking operation, a dragging operation, or the like.

It should be noted that the display of the plurality of sub-pages in the activity-embedding mode may be applied in a landscape scene of the terminal device. The terminal device may include a large-screen mobile phone, a folding-screen mobile phone, a tablet computer, and the like.

Figure 2:
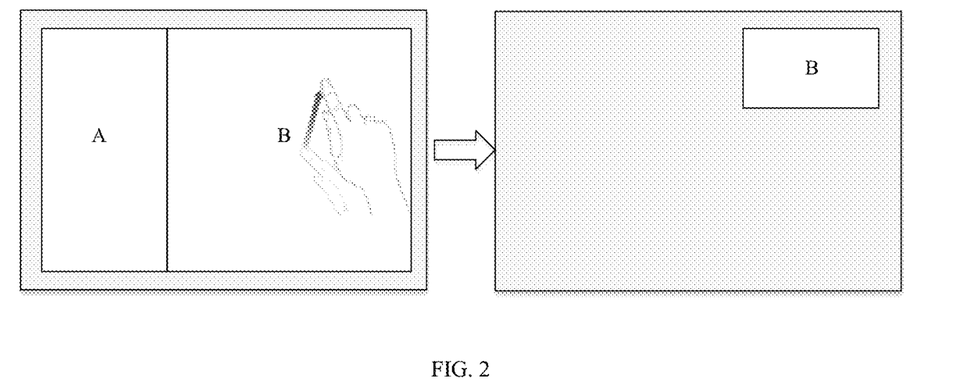
FIG. 2 is a schematic diagram showing the switch of a display page from an activity-embedding mode to a freeform window mode according to an example of the present disclosure.

For example, as shown in FIG. 2, the target application is displayed by two sub-pages A and B in the activity-embedding mode. In response to the first operation (finger sliding operation), the display of the sub-page B is switched to the freeform window mode, and the sub-page B is the target sub-page. It should be noted that a background of the display page in the freeform window mode may be a desktop background of the terminal device, or a sub-page (e.g., the sub-page A) other than the target sub-page in the activity-embedding mode, which is not specifically limited in the present disclosure.

In addition, FIG. 2 only shows an example where the first operation is the sliding operation, and the first operation may also be such as a two-finger approaching operation where two fingers slide on the screen and gradually approach each other, a dragging operation, a clicking operation or others in practice.

In step 102, first display configuration information of a first display window for displaying the target sub-page in the activity-embedding mode is obtained.

In some examples of the present disclosure, when the target sub-page is switched into the small-window display mode from the activity-embedding mode, relevant configuration information may be searched to obtain the first display configuration information of the first display window for displaying the target sub-page in the activity-embedding mode.

In step 103, second display configuration information in the freeform window mode is obtained by modifying the first display configuration information according to the freeform window mode.

In some examples of the present disclosure, relevant configuration information may be searched to determine the second display configuration information of a second display window of the target sub-page in the freeform window mode, and the first display configuration information may be modified into the second display configuration information in the freeform window mode.

In step 104, the target sub-page is displayed in a second display window in the freeform window mode according to the second display configuration information.

In this way, the target sub-page is switched to be displayed in the second display window in the freeform window mode from the activity-embedding mode according to the second display configuration information.

To sum up, the target sub-page to be switched into the freeform window mode is determined from a plurality of the sub-pages of the target application in the activity-embedding mode in response to the first operation, the first display configuration information of the first display window for displaying the target sub-page in the activity-embedding mode is obtained, the second display configuration information in the freeform window mode is obtained by modifying the first display configuration information according to the freeform window mode, and the target sub-page is displayed in the second display window in the freeform window mode according to the second display configuration information. In this way, the first display configuration information of the first display window for displaying the target sub-page in the activity-embedding mode is modified into the second display configuration information in the freeform window mode, such that the display of the target sub-page may be switched to the freeform window mode from the activity-embedding mode, which satisfies user's personalized needs.

In order to clearly illustrate how to obtain the first display configuration information of the first display window for displaying the target sub-page in the activity-embedding mode in the above-mentioned examples, the present disclosure further provides a page display method.

Figure 3:
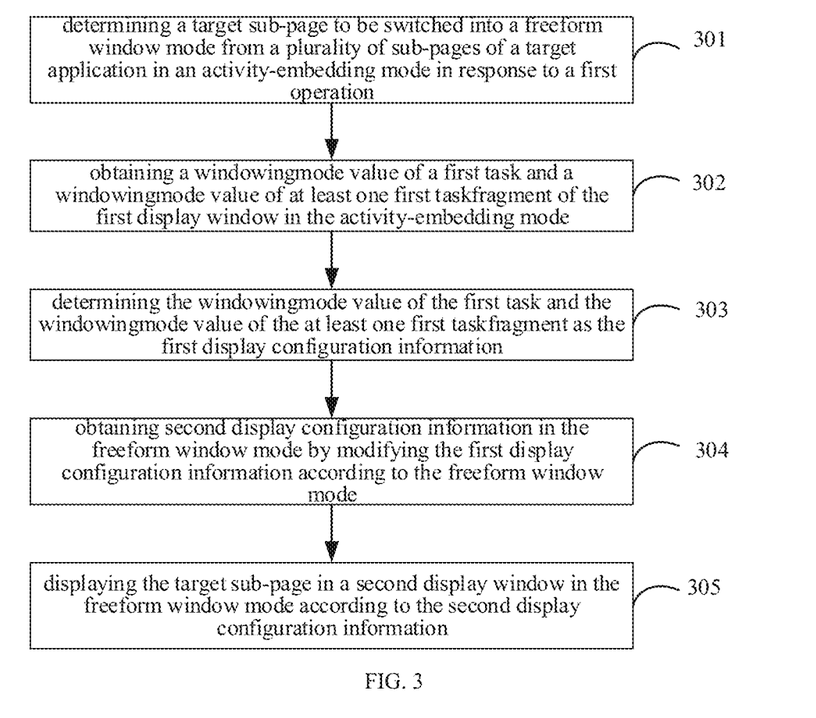
FIG. 3 is a schematic flow chart of a page display method according to an example of the present disclosure.

FIG. 3 is a schematic flow chart of a page display method according to an example of the present disclosure.

As shown in FIG. 3, the page display method includes step 301 to step 305 as follows.

In step 301, a target sub-page to be switched into a freeform window mode is determined from a plurality of sub-pages of a target application in an activity-embedding mode in response to a first operation.

In step 302, windowingmode value of a first task and a windowingmode value of at least one first taskfragment of the first display window in the activity-embedding mode are obtained.

It should be noted that a "task" refers to a display task in a certain window mode and may include at least one taskfragments; and a taskfragment represents a basic container that can be used to contain activities or other, which is also able to manage the activity lifecycle and updates the visibilities of the activities in it. The first task refers to a display task in the activity-embedding mode; and a second task as described below refers to a display task in the freeform window mode.

Figure 4:
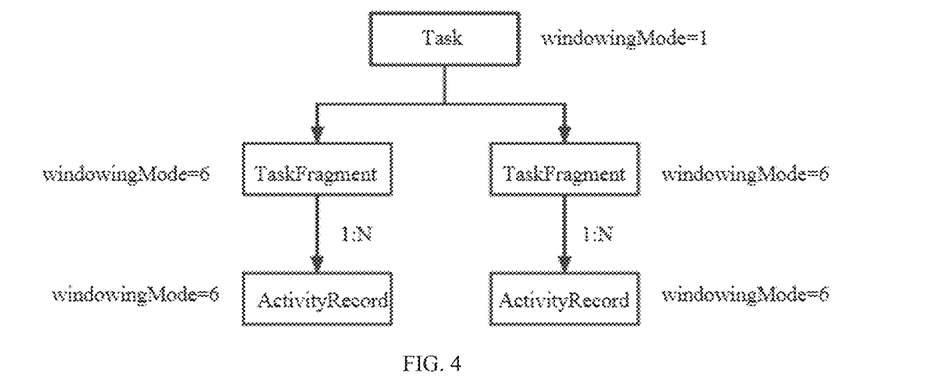
FIG. 4 is a schematic diagram showing display configuration information of an activity-embedding mode according to an example of the present disclosure.
Figure 6:
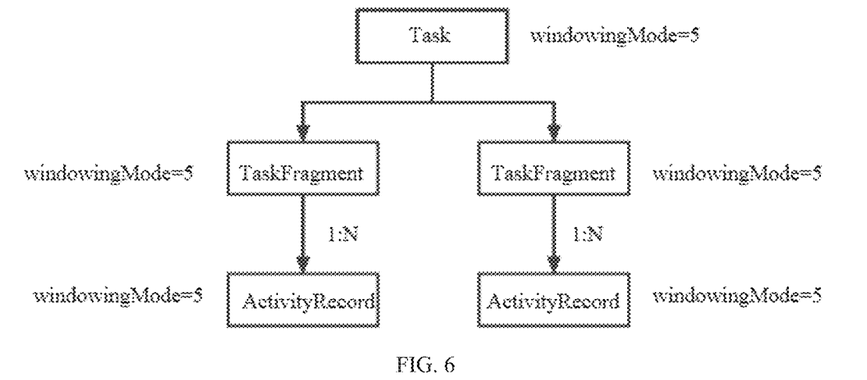
FIG. 6 is a schematic diagram showing display configuration information of a freeform window mode according to an example of the present disclosure.

It should be noted that a windowingmode value of a task is configured to indicate a display mode of a display window for the task, and a windowingmode value of a taskfragment is configured to indicate interface display information of the display window for the task in the corresponding display mode. It should be understood that, different display modes of a task correspond to different windowingmode values of the task. For example, as shown in FIG. 4, the windowingmode value of a task in the activity-embedding mode may be 1 (as shown in FIG. 4, the windowingmode value of the task is 1), and the windowingmode value of at least one taskfragment in the activity-embedding mode may be 6 (as shown in FIG. 4, the windowingmode value of each taskfragment is 6). As shown in FIG. 6, The windowingmode value of a task in the freeform window mode may be 5, and the windowingmode value of at least one taskfragment in the freeform window mode may be 5.

Herein, the windowingmode value of the first task is configured to indicate a display mode of the first display window, and the windowingmode value of the first taskfragment is configured to indicate interface display information of the first display window corresponding to the activity-embedding mode.

In some examples of the present disclosure, the windowingmode value of the first task and the windowingmode value of the at least one first taskfragment of the first display window in the activity-embedding mode may be obtained by searching relevant configuration information.

The windowingmode value of the first task is configured to indicate the display mode of the first display window, and the windowingmode value of the first taskfragment is configured to indicate the interface display information of the first display window corresponding to the activity-embedding mode.

A taskfragment window may manage interface display information of a plurality of display windows. For example, the interface display information of the plurality of display windows in one taskfragment window corresponds with a windowingmode value of an activityrecord (such as the windowingmode value of the activityrecord as shown in FIG. 4) of the respective display window, and different windowingmode values of an activityrecord of a display window correspond to different interface display information of the display window. The interface display information includes at least one of window display content information, window display size information, window display state information, a master-slave relationship between windows, and window display position information.

In addition, a taskfragment window may manage a plurality of activityrecords, and the windowingmode values of the plurality of activityrecords are identical to the windowingmode values of the respective taskfragments. For example, as shown in FIG. 4, the windowingmode values of the taskfragments are 6, and the windowingmode values of the activityrecords under respective taskfragments are 6.

In step 303, the windowingmode value of the first task and the windowingmode value of the at least one first taskfragment are determined as the first display configuration information.

In some examples of the present disclosure, the first display configuration information may include the windowingmode value of the first task and the windowingmode value of the at least one first taskfragment. For example, the first display configuration information corresponding to the activity-embedding mode may include the windowingmode value of the first task (e.g., the windowingmode value of the task is 1) and windowingmode values of two first taskfragments (e.g., the windowingmode value of each of the two taskfragments is 6).

In step 304, second display configuration information in the freeform window mode is obtained by modifying the first display configuration information according to the freeform window mode.

In step 305, the target sub-page is displayed in a second display window in the freeform window mode according to the second display configuration information.

It should be noted that, the steps 301 and 304-305 may be implemented according to the corresponding steps in any one of the examples of the present disclosure, which is not limited and will not be repeated herein.

To sum up, the windowingmode value of the first task and the windowingmode value of the at least one first taskfragment of the first display window in the activity-embedding mode are obtained and determined as the first display configuration information. In this way, by obtaining the windowingmode value of the first task and the windowingmode value of the at least one first taskfragment of the first display window for displaying the target sub-page in the activity-embedding mode, the first display configuration information corresponding to the activity-embedding mode may be determined.

In order to clearly illustrate how to modify the first display configuration information according to the freeform window mode to obtain the second display configuration information in the freeform window mode as described in the above-mentioned examples, the present disclosure further provides a page display method.

Figure 5:
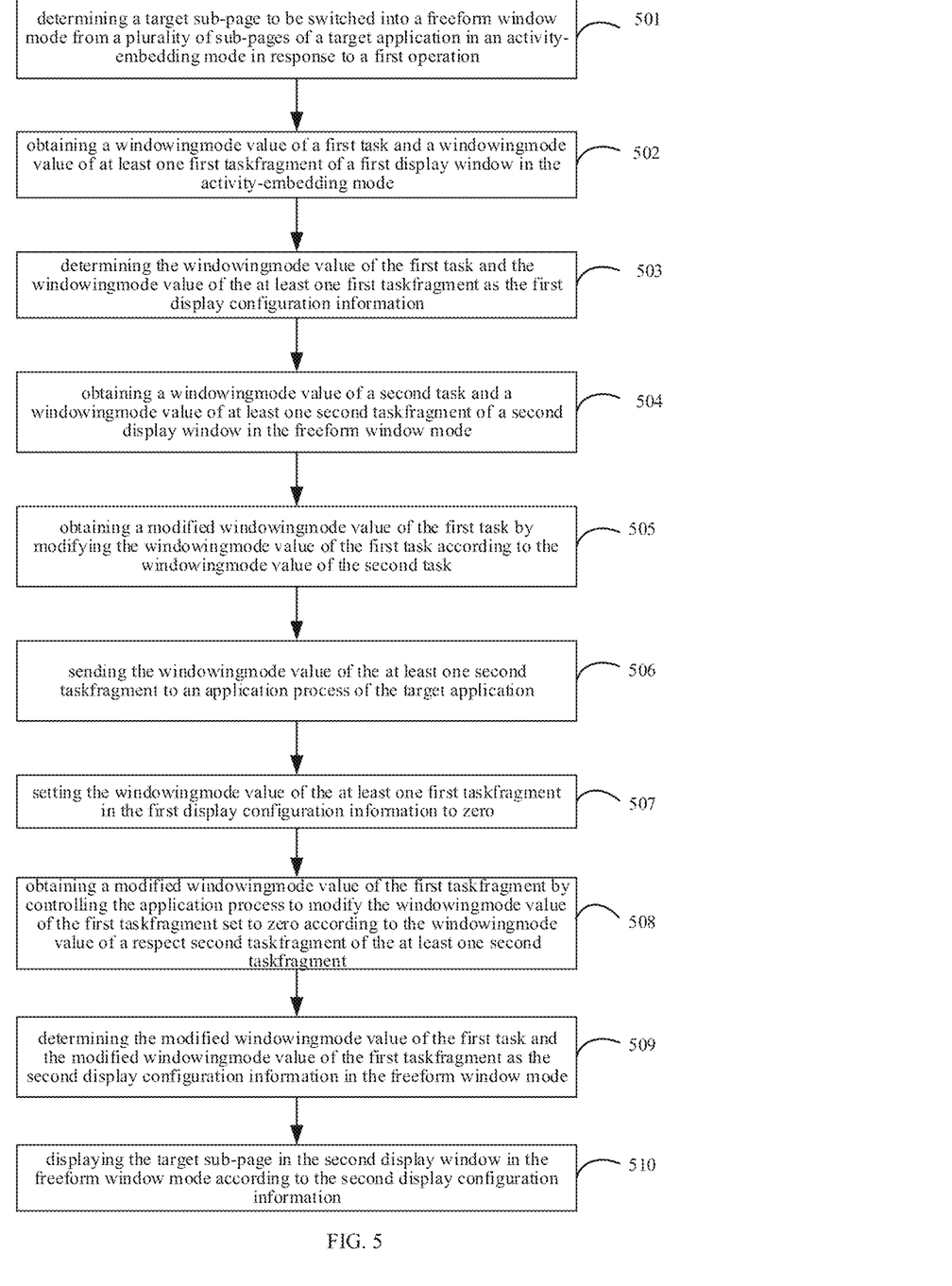
FIG. 5 is a schematic flow chart of a page display method according to an example of the present disclosure.

FIG. 5 is a schematic flow chart of a page display method according to an example of the present disclosure.

As shown in FIG. 5, the page display method includes step 501 to step 510 as follows.

In step 501, a target sub-page to be switched into a freeform window mode is determined from a plurality of sub-pages of a target application in an activity-embedding mode in response to a first operation.

In step 502, windowingmode value of a first task and a windowingmode value of at least one first taskfragment of a first display window in the activity-embedding mode are obtained.

The windowingmode value of the first task is configured to indicate a display mode of the first display window, and the windowingmode value of the first taskfragment is configured to indicate interface display information of the first display window corresponding to the activity-embedding mode.

In step 503, the windowingmode value of the first task and the windowingmode value of the at least one first taskfragment are determined as the first display configuration information.

In step 504, a windowingmode value of a second task and a windowingmode value of at least one second taskfragment of a second display window in the freeform window mode are obtained.

Herein, the windowingmode value of the second task is configured to indicate the display mode of the second display window, and the windowingmode value of the second taskfragment is configured to indicate the interface display information of the second display window corresponding to the freeform window mode.

In some examples, relevant configuration information are searched to obtain the windowingmode value of the second task and the windowingmode value of the at least one second taskfragment of the second display page in the freeform window mode.

As shown in FIG. 6, the windowingmode value of a task in the freeform window mode may be 5 (as shown in FIG. 6, the windowingmode value of the task is 5), and the windowingmode value of the at least one taskfragment in the freeform window mode may be 5 (as shown in FIG. 6, the windowingmode value of each taskfragment is 5). A taskfragment window may manage interface display information of a plurality of display windows. For example, the interface display information of the plurality of display windows under one taskfragment window may be determined according to the windowingmode values of the respective taskfragments. For example, as shown in FIG. 6, the windowingmode value of each taskfragment is 5, and the windowingmode values of the activityrecords under the respective taskfragments are 5. It should be noted that, in order to avoid truncation of contents in the display window in the freeform window mode, a plurality of display windows in the freeform window mode may be overlapped, such that the number of the display windows in the freeform window mode is one.

In step 505, a modified windowingmode value of the first task is obtained by modifying the windowingmode value of the first task according to the windowingmode value of the second task.

For example, when the display of the target sub-page is switched to the freeform window mode from the activity-embedding mode, the windowingmode value of a task may be modified from 1 in the activity-embedding mode to 5 in the freeform window mode.

In step 506, the windowingmode value of the at least one second taskfragment is sent to an application process of the target application.

In some examples of the present disclosure, in order to facilitate the modification of the windowingmode value of the taskfragment in different display modes, the windowingmode value of the at least one second taskfragment may be sent to the application process of the target application to notify the application process to modify the windowingmode value of the at least one first taskfragment according to the windowingmode value of the at least one second taskfragment.

In step 507, the windowingmode value of the at least one first taskfragment in the first display configuration information is set to zero.

In order to effectively modify the windowingmode value of the first taskfragment and avoid random modification of the windowingmode value of the first taskfragment, the windowingmode value of the at least one first taskfragment in the first display configuration information may be set to zero to make the windowingmode value of the at least one first taskfragment in an unconfigured state.

In step 508, a modified windowingmode value of the first taskfragment is obtained by controlling the application process to modify the windowingmode value of the first taskfragment set to zero according to the windowingmode value of a respective second taskfragment of the at least one second taskfragment.

Further, the application process is controlled to modify the windowingmode value of the respective first taskfragment set to zero according to the windowingmode value of the at least one second taskfragment. For example, the windowingmode value of the second taskfragment is 5, the windowingmode value of the first taskfragment is modified from 6 to 5, to obtain the modified windowingmode value of the first taskfragment.

As shown in FIG. 6, the windowingmode value of the second taskfragment is 5, and the windowingmode value of the first taskfragment may be set to zero (i.e., the windowingmode value of the first taskfragment is 0), and then the windowingmode value of the first taskfragment set to zero is modified to be the same as the windowingmode value of the second taskfragment, that is, the windowingmode value of the first taskfragment is modified to be 5.

In step 509, the modified windowingmode value of the first task and the modified windowingmode value of the first taskfragment are determined as the second display configuration information in the freeform window mode.

In some examples of the present disclosure, the modified windowingmode value of the first task is the windowingmode value of the second task in the freeform window mode, and the modified windowingmode value of the first taskfragment is the windowingmode value of the second taskfragment in the freeform window mode. Therefore, the modified windowingmode value of the first task and the modified windowingmode value of the first taskfragment may be used as the second display configuration information in the freeform window mode.

Further, in order to obtain the interface display information of the second display window in the freeform window mode, the interface display information of the first display window in the activity-embedding mode may be modified. Alternatively, the interface display information of the first display window in the activity-embedding mode is set to zero; interface display information of a display window corresponding to the modified windowingmode value of the first taskfragment is determined according to the modified windowingmode value of the first taskfragment; and the interface display information of the first display window set to zero is modified according to the interface display information of the display window corresponding to the modified windowingmode value of the first taskfragment.

For example, the interface display information of the first display window in the activity-embedding mode may be set to zero. For example, a windowingmode value of an activityrecord under a taskfragment is set to zero, and then is modified into 5 according to the windowingmode value of the corresponding taskfragment as shown in FIG. 6.

In step 510, the target sub-page is displayed in the second display window in the freeform window mode according to the second display configuration information.

It should be noted that, the steps 501-503 and 510 may be implemented according to the corresponding steps in any one of the examples of the present disclosure, which is not limited and will not be repeated herein.

To sum up, the windowingmode value of the second task and the windowingmode value of the at least one second taskfragment of the second display window in the freeform window mode are obtained; the modified windowingmode value of the first task is obtained by modifying the windowingmode value of the first task according to the windowingmode value of the second task; the windowingmode value of the at least one second taskfragment is sent to the application process of the target application; the windowingmode value of the at least one first taskfragment in the first display configuration information is set to zero; the modified windowingmode value of the first taskfragment is obtained by controlling the application process to modify the windowingmode value of the first taskfragment set to zero according to the windowingmode value of the respective second taskfragment of the at least one second taskfragment; and the modified windowingmode value of the first task and the modified windowingmode value of the first taskfragment are determined as the second display configuration information in the freeform window mode. In this way, the windowingmode value of the first task and the windowingmode value of the at least one first taskfragment in the activity-embedding mode are modified based on the windowingmode value of the second task and the windowingmode value of the at least one second taskfragment in the freeform window mode to determine the second display configuration information corresponding to the freeform window mode.

It should be noted that the display page of the target application may be switched into the freeform window mode from the activity-embedding mode, and may also be switched into the activity-embedding mode from the freeform window mode. In order to clearly illustrate how to switch the display page into the activity-embedding mode from the freeform window mode, the present disclosure further provides a page display method.

Figure 7:
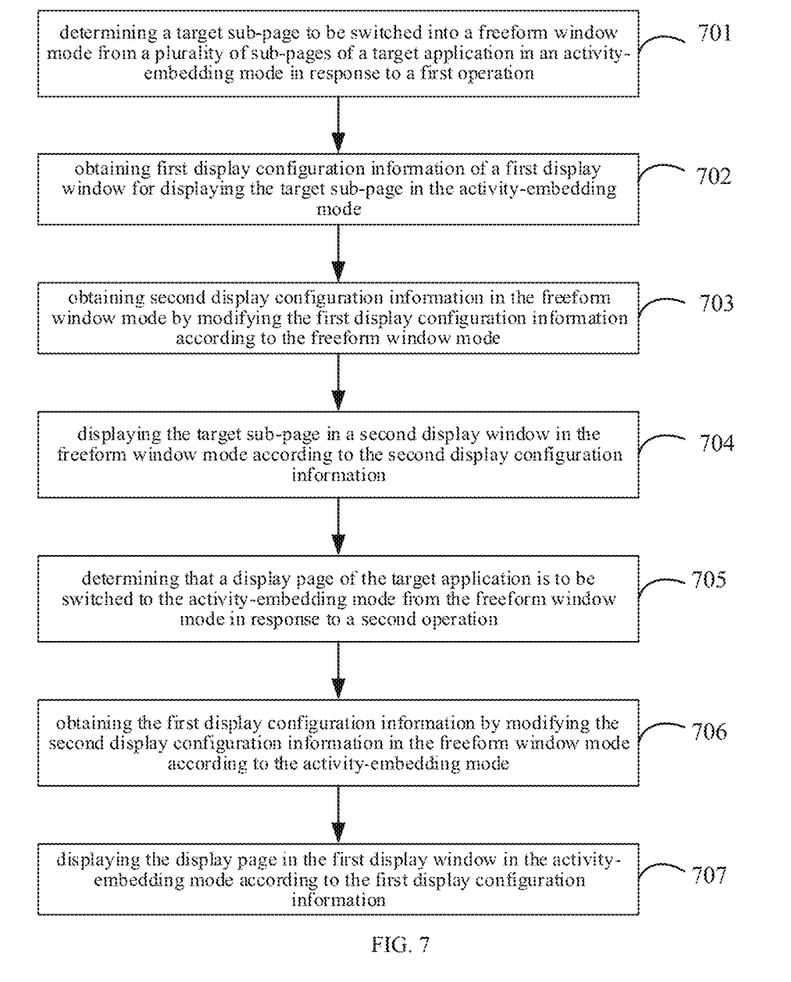
FIG. 7 is a schematic flow chart of a page display method according to an example of the present disclosure.

FIG. 7 is a schematic flow chart of a page display method according to an example of the present disclosure.

As shown in FIG. 7, the page display method includes step 701 to step 707 as follows.

In step 701, a target sub-page to be switched into a freeform window mode is determined from a plurality of sub-pages of a target application in an activity-embedding mode in response to a first operation.

In step 702, first display configuration information of a first display window for displaying the target sub-page in the activity-embedding mode is obtained.

In step 703, second display configuration information in the freeform window mode is obtained by modifying the first display configuration information according to the freeform window mode.

In step 704, the target sub-page is displayed in a second display window in the freeform window mode according to the second display configuration information.

In step 705, it is determined that a display page of the target application is to be switched to the activity-embedding mode from the freeform window mode in response to a second operation.

In some examples of the present disclosure, in a case where the display page of the target application is displayed in the freeform window mode, in response to the second operation, it is determined that the display page of the target application is to be switched to the activity-embedding mode from the freeform window mode. The second operation may be a sliding operation, a clicking operation, a dragging operation, or the like.

In step 706, the first display configuration information is obtained by modifying the second display configuration information in the freeform window mode according to the activity-embedding mode.

In some examples, the second display configuration information corresponding to the second display window in the current freeform window mode and the first display configuration information corresponding to the first display window in the activity-embedding mode are determined by searching relevant configuration information, and the second display configuration information of the second display window in the current freeform window mode is modified into the first display configuration information in the activity-embedding mode.

In step 707, the display page is displayed in the first display window in the activity-embedding mode according to the first display configuration information.

Further, the display page in the freeform window mode is switched to be displayed in the display window of the sub-page in the activity-embedding mode according to the first display configuration information.

Figure 8:
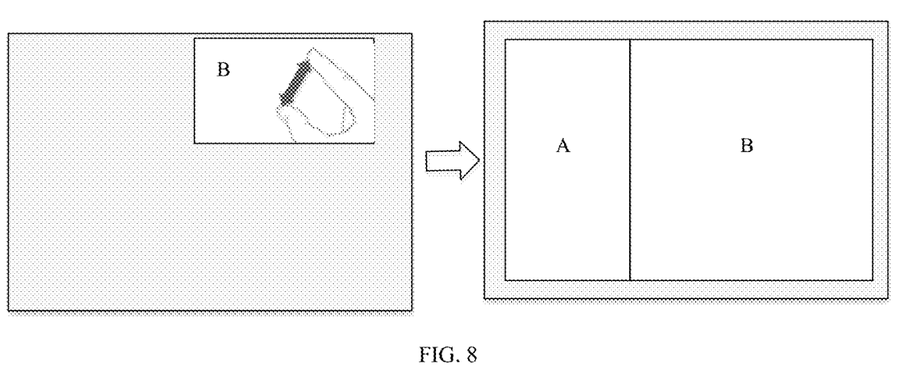
FIG. 8 is a schematic diagram showing the switch of a display page from a freeform window mode to an activity-embedding mode according to an example of the present disclosure.

For example, as shown in FIG. 8, the target application is displayed as a display page B in the current freeform window mode, and in response to the second operation (such as a two-finger separation operation where two fingers slide on the screen and move away from each other), the display page B is switched to be displayed by a sub-page in the activity-embedding mode.

FIG. 8 only shows an example where the second operation is a two-finger separation operation, and the second operation may also be such as a sliding down operation, a dragging operation or a clicking operation in practice.

It should be noted that, the steps 701 to 704 may be implemented according to the corresponding steps in any one of the examples of the present disclosure, which is not limited and will not be repeated herein.

To sum up, the first display configuration information of the second display window of the display page in the freeform window mode is modified to the first display configuration information in the activity-embedding mode, such that the display page in the freeform window mode may be switched to be displayed in the activity-embedding mode, which satisfies user's personalized needs.

In order to illustrate the above-mentioned examples more clearly, an example is provided as follows.

Figure 9:
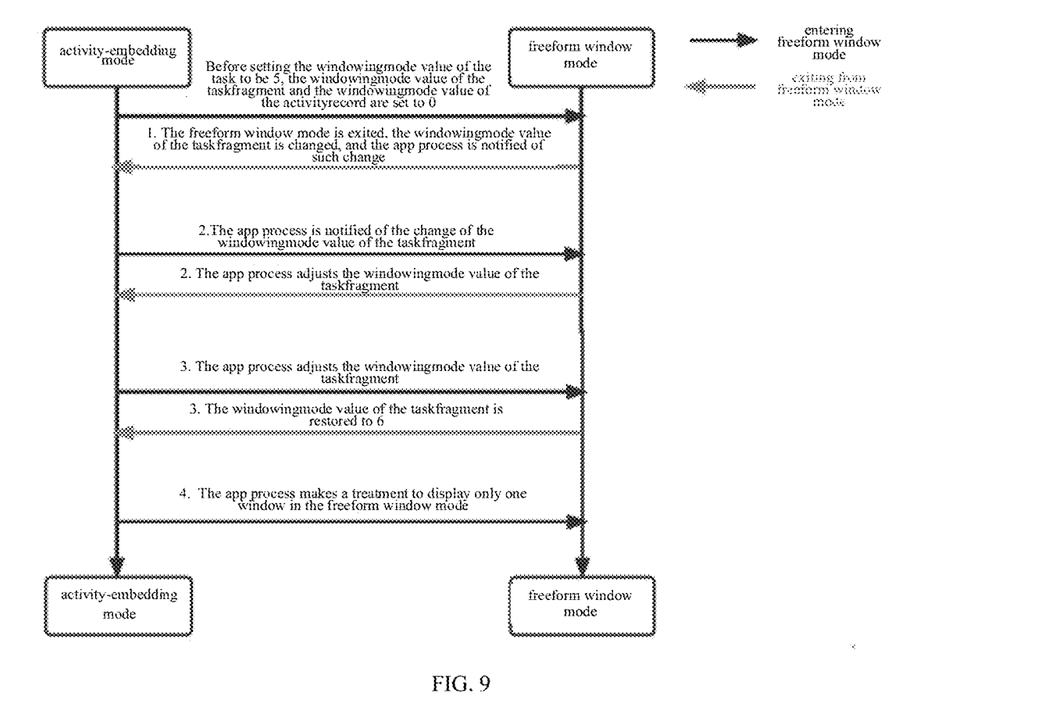
FIG. 9 is a schematic diagram showing an interact between a freeform window mode and an activity-embedding mode according to an example of the present disclosure.

For example, as shown in FIG. 9, in the first display configuration information under the activity-embedding mode, the windowingmode value of the first task is 1 (i.e., the windowingmode value of the task is 1), and the windowingmode value of the first taskfragment is 6 (i.e., the windowingmode value of the taskfragment is 6). In the second display configuration information under the freeform window mode, the windowingmode value of the second task is 5 (i.e., the windowingmode value of the task is 5), and the windowingmode value of the second taskfragment is 5 (i.e., the windowingmode value of the taskfragment is 5). The page display method according examples of the present disclosure may be implemented as follows.

1. Before setting the windowingmode value of the task to be 5, the windowingmode value of the taskfragment and the windowingmode value of the activityrecord are set to 0.
2. The application program (application, app for short) process is notified of the change of the windowingmode value of the taskfragment.
3. The app process adjusts the windowingmode value of the taskfragment.
4. The app process makes a treatment to display only one window in the freeform window mode.

Furthermore, exiting from the freeform window mode and entering the activity-embedding mode may be realized by the following steps.

1. The freeform window mode is exited, the windowingmode value of the taskfragment is changed, and the app process is notified of such change.
2. The app process adjusts the windowingmode value of the taskfragment.
3. The windowingmode value of the taskfragment is restored to 6.

In the page display method according to examples of the present disclosure, the target sub-page to be switched into the freeform window mode is determined from a plurality of sub-pages of the target application in the activity-embedding mode in response to the first operation; the first display configuration information of the first display window for displaying the target sub-page in the activity-embedding mode is obtained; the second display configuration information in the freeform window mode is obtained by modifying the first display configuration information according to the freeform window mode; and the target sub-page is displayed in the second display window in the freeform window mode according to the second display configuration information. In this way, the first display configuration information of the first display window for displaying the target sub-page in the activity-embedding mode is modified into the second display configuration information in the freeform window mode, such that the display of the target sub-page may be switched from the activity-embedding mode to the small-window display mode, which satisfies the user's personalized needs. At the same time, there is no need to rely on a third-party application program to perform the adaptation of the display window, which may avoid the truncation phenomenon of the contents in the window display and reduce resource consumption.

In order to realize the above-mentioned examples, the present disclosure further provides a page display device.

Figure 10:
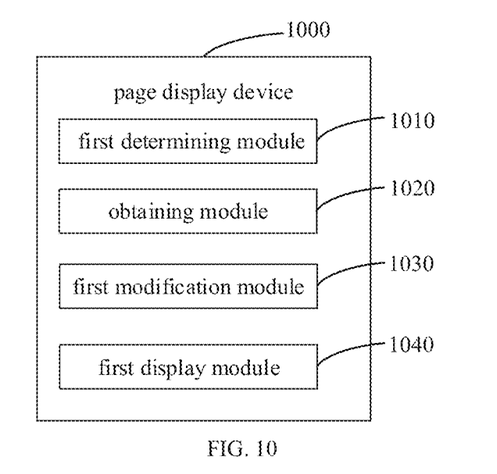
FIG. 10 is a schematic diagram showing a page display device according to an example of the present disclosure.

FIG. 10 is a schematic diagram showing a page display device according to an example of the present disclosure.

As shown in FIG. 10, the page display device 1000 includes a first determining module 1010, an obtaining module 1020, a first modification module 1030 and a first display module 1040.

The first determining module 1010 is configured to determine a target sub-page to be switched into a freeform window mode from a plurality of sub-pages of a target application in an activity-embedding mode in response to a first operation. The obtaining module 1020 is configured to obtain first display configuration information of a first display window for displaying the target sub-page in the activity-embedding mode. The first modification module 1030 is configured to obtain second display configuration information in the freeform window mode by modifying the first display configuration information according to the freeform window mode. The first display module 1040 is configured to display the target sub-page in a second display window in the freeform window mode according to the second display configuration information.

In some examples of the present disclosure, the obtaining module 1020 is specifically configured to obtain windowingmode value of a first task and a windowingmode value of at least one first taskfragment of the first display window in the activity-embedding mode, and determine the windowingmode value of the first task and the windowingmode value of the at least one first taskfragment as the first display configuration information. The windowingmode value of the first task is configured to indicate a display mode of the first display window, and the windowingmode value of the first taskfragment is configured to indicate interface display information of the first display window corresponding to the activity-embedding mode.

In some examples of the present disclosure, the first modification module 1030 is specifically configured to: obtain a windowingmode value of a second task and a windowingmode value of at least one second taskfragment of the second display window in the freeform window mode; obtain a modified windowingmode value of the first task by modifying the windowingmode value of the first task according to the windowingmode value of the second task; send the windowingmode value of the at least one second taskfragment to an application process of the target application; set the windowingmode value of the at least one first taskfragment in the first display configuration information to zero; obtain a modified windowingmode value of the first taskfragment by controlling the application process to modify the windowingmode value of the first taskfragment set to zero according to the windowingmode value of a respective second taskfragment of the at least one second taskfragment; determine the modified windowingmode value of the first task and the modified windowingmode value of the first taskfragment as the second display configuration information in the freeform window mode.

In some examples of the present disclosure, the first modification module 1030 is further configured to: set interface display information of the first display window in the activity-embedding mode to zero; determine interface display information of a display window corresponding to the modified windowingmode value of the first taskfragment according to the modified windowingmode value of the first taskfragment; and modify the interface display information of the first display window set to zero according to the interface display information of the display window corresponding to the modified windowingmode value of the first taskfragment.

In some examples of the present disclosure, the interface display information may include at least one of window display content information, window display size information, window display state information, a master-slave relationship between windows, and window display position information.

In some examples of the present disclosure, the page display device 1000 further includes a second determining module, a second modification module and a second display module.

The second determining module is configured to determine that a display page of the target application is to be switched to the activity-embedding mode from the freeform window mode in response to a second operation. The second modification module is configured to obtain the first display configuration information by modifying the second display configuration information in the freeform window mode according to the activity-embedding mode. The second display module is configured to display the display page in the first display window in the activity-embedding mode according to the first display configuration information.

With the page display device according to examples of the present disclosure, the target sub-page to be switched into the freeform window mode is determined from a plurality of sub-pages of the target application in the activity-embedding mode in response to the first operation; the first display configuration information of the first display window for displaying the target sub-page in the activity-embedding mode is obtained; the second display configuration information in the freeform window mode is obtained by modifying the first display configuration information according to the freeform window mode; and the target sub-page is displayed in the second display window in the freeform window mode according to the second display configuration information. In this way, the page display device is able to modify the first display configuration information of the first display window for displaying the target sub-page in the activity-embedding mode into the second display configuration information in the freeform window mode, such that the display of the target sub-page may be switched from the activity-embedding mode to the small-window display mode, which satisfies the personalized needs of the users. At the same time, there is no need to rely on a third-party application program to perform adaptation of the display window, which may avoid the truncation phenomenon of contents in the display window and reduce resource consumption.

In order to realize the above-mentioned examples, the present disclosure further provides an electronic device. The electronic device includes at least one processor, and a memory communicatively connected to the at least one processor and having stored therein instructions that are executable by the at least one processor. The instructions, when executed by the at least one processor, cause the at least one processor to execute the page display method as described in the above-mentioned examples of the present disclosure.

In order to realize the above-mentioned examples, the present disclosure further provides a non-transitory computer-readable storage medium. The non-transitory computer-readable storage medium has stored therein computer instructions that, when executed by a computer, cause the computer to perform the page display method as described in the above-mentioned examples of the present disclosure.

In order to realize the above-mentioned examples, the present disclosure further provides a computer program product. An instruction in the computer program product, when executed by a processor, causes the processor to perform the page display method as described in the above-mentioned examples of the present disclosure.

Figure 11:
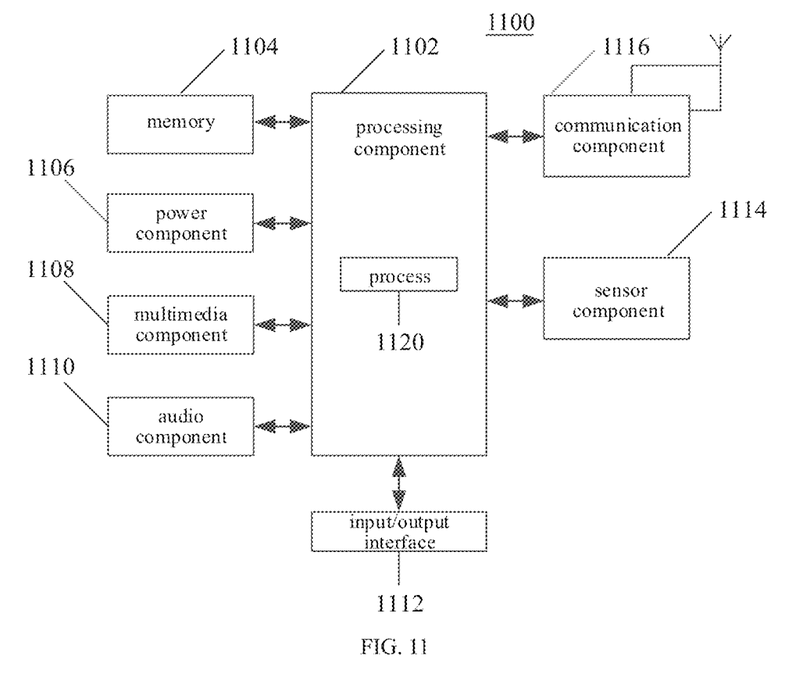
FIG. 11 is a block diagram of an electronic device according to an example of the present disclosure.

FIG. 11 is a block diagram of an electronic device according to an example of the present disclosure. For example, the terminal device 1100 may be a mobile phone, a computer, a digital broadcasting terminal, a messaging device, a game console, a tablet device, a medical device, a fitness device, a personal digital assistant, etc.

Referring to FIG. 11, the electronic device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 generally controls the overall operations of the electronic device 1100, such as operations associated with display, telephone calls, data communications, camera operations, and recording operations. The processing component 1102 may include one or more processors 1120 to execute instructions to complete all or some of the steps of the above method. In addition, the processing component 1102 may include one or more modules to facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operation of the electronic device 1100. Examples of these data include instructions for any application or method operating on the electronic device 1100, e.g., contact data, phonebook data, messages, pictures, videos, etc. The memory 1104 may be implemented by any type of volatile or non-volatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1106 provides power to various components of the electronic device 1100. The power components 1106 may include a power management system, one or more power sources, and other components associated with generation, management, and distribution of power to the electronic device 1100.

The multimedia component 1108 includes a screen that provides an output interface between the electronic device 1100 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 1108 includes a front camera and/or a rear camera. When the electronic device 1100 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 1110 is configured to output and/or input audio signals. For example, the audio component 1110 includes a microphone (MIC). When the electronic device 1100 is in an operation mode, such as a call mode, a recording mode, and a voice recognition mode, the microphone is configured to receive an external audio signal. The received audio signal may be further stored in the memory 1104 or transmitted via the communication component 1116. In some examples, the audio component 1110 further includes a speaker for outputting audio signals.

The I/O interface 1112 provides an interface between the processing component 1102 and a peripheral interface module. The peripheral interface module may be a keyboard, a click wheel, buttons, etc. These buttons may include, but are not limited to, a home button, a volume button, a start button, and a lock button.

The sensor component 1114 includes one or more sensors for providing the electronic device 1100 with status assessment in various aspects. For example, the sensor component 1114 may detect the on/off status of the electronic device 1100 and the relative positioning of components, for example, the display and the keypad, of the electronic device 1100. The sensor component 1114 can also detect the position change of the electronic device 1100 or a component of the electronic device 1100, the presence or absence of contact between the user and the electronic device 1100, the orientation or acceleration/deceleration of the electronic device 1100, and the temperature change of the electronic device 1100. The sensor component 1114 may include a proximity sensor configured to detect the presence of nearby objects without any physical contact. The sensor component 1114 may also include a light sensor, such as a CMOS or CCD image sensor, for use in imaging applications. In some examples, the sensor component 1114 may also include an acceleration sensor, a gyroscope sensor, a magnetic sensor, a pressure sensor or a temperature sensor.

The communication component 1116 is configured to facilitate wired or wireless communication between the electronic device 1100 and other devices. The electronic device 1100 can access a wireless network based on a communication standard, such as WiFi, 4G, 5G, or a combination thereof. In an example, the communication component 1116 receives a broadcast signal or broadcast related information from an external broadcast management system via a broadcast channel. In an example, the communication component 1116 further includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology and other technologies.

In an example, the electronic device 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an example, there is also provided a non-transitory computer-readable storage medium having stored therein instructions, such as a memory 1104 including instructions, which may be executed by the processor 1120 of the electronic device 1100 to perform the above methods. For example, the non-transitory computer-readable storage medium may be a ROM, a random access memory (RAM), a CD-ROM, a magnetic tape, a floppy disk, an optical data storage device, etc.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine different embodiments or examples and the features described in different embodiments or examples in the absence of mutual contradiction.

In addition, terms such as "first" and "second" are used for purposes of description and are not intended to indicate or imply relative importance or to imply the number of indicated technical features. Thus, the feature defined with "first" and "second" may include at least one of this feature. In the description of the present disclosure, "a plurality of" means two or more, for example, two or three, unless specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Any process or method described in a flow chart or described herein in other ways may be understood to include one or more modules, segments or portions of codes of executable instructions for achieving specific logical functions or steps in the process. In addition, the scope of a preferred embodiment of the present disclosure includes other implementations, in which the functions may be performed out of the order shown or discussed, including substantially concurrently or in the reverse order depending on the functions involved, which should be understood by those skilled in the art.

The logic and/or step shown in the flow chart or described herein in other manners, for example, a particular sequence table of executable instructions for realizing the logical function, may be specifically achieved in any computer readable medium to be used by an instruction execution system, device or equipment (such as a system based on computers, a system including processors or other systems capable of obtaining an instruction from the instruction execution system, device and equipment and executing the instruction), or to be used in combination with the instruction execution system, device and equipment. As to the specification, "the computer readable medium" may be any device capable of including, storing, communicating, propagating or transferring programs to be used by or in combination with the instruction execution system, device or equipment. More specific examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon. This is because, for example, the paper or other appropriate medium may be optically scanned and then edited, decrypted or processed with other appropriate methods when necessary to obtain the programs in an electric manner, and then the programs may be stored in a computer memory.

It should be understood that each part of the present disclosure may be realized by a hardware, software, firmware or their combination. In the above embodiments, a plurality of steps or methods may be realized by the software or firmware stored in the memory and executed by the appropriate instruction execution system. For example, if they are realized by the hardware, likewise in another embodiment, the steps or methods may be realized by any one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a non-transitory computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be realized in a form of hardware or in a form of software functional module. If the integrated module is realized in the form of software functional module and sold or used as a separate product, the integrated module may also be stored in a non-transitory computer readable storage medium.

The above-mentioned storage medium may be a read-only memory, a magnetic disc, an optical disc, etc. Although explanatory embodiments have been shown and described above, it would be appreciated by those skilled in the art that the above embodiments cannot be construed to limit the present disclosure, and changes, variations, alternatives, and modifications can be made in the embodiments without departing from the scope of the present disclosure.

What is claimed is:

1. A page display method, comprising:
   in response to a dragging operation of a target sub-page, switching, by a page display device, the target sub-page into a freeform window mode, wherein the target sub-page is from a plurality of sub-pages in a target application, and the target application is in an activity-embedding mode; and
   determining, by the page display device, at least one sub-page of the plurality of sub-pages other than the target sub-page as a background.

2. The method according to claim 1, wherein switching the target sub-page into the freeform window mode comprises:
   displaying, by the page display device, the target sub-page in a display window in the freeform window mode based on display configuration information.

3. The method according to claim 2, wherein displaying the target sub-page in the display window in the freeform window mode based on the display configuration information comprises:
   obtaining, by the page display device, first display configuration information of a first display window for displaying the target sub-page in the activity-embedding mode;
   obtaining, by the page display device, second display configuration information in the freeform window mode by modifying the first display configuration information according to the freeform window mode; and
   displaying, by the page display device, the target sub-page in a second display window in the freeform window mode according to the second display configuration information.

4. The method according to claim 3, wherein obtaining the first display configuration information of the first display window for displaying the target sub-page in the activity-embedding mode comprises:
   obtaining a windowingmode value of a first task and a windowingmode value of at least one first taskfragment of the first display window in the activity-embedding mode, wherein the windowingmode value of the first task is configured to indicate a display mode of the first display window, and the windowingmode value of the at least one first taskfragment is configured to indicate interface display information of the first display window corresponding to the activity-embedding mode; and
   determining the windowingmode value of the first task and the windowingmode value of the at least one first taskfragment as the first display configuration information.

5. The method according to claim 3, wherein obtaining the second display configuration information in the freeform window mode by modifying the first display configuration information according to the freeform window mode comprises:
   obtaining a windowingmode value of a second task and a windowingmode value of at least one second taskfragment of the second display window in the freeform window mode;
   obtaining a modified windowingmode value of a first task by modifying the windowingmode value of the first task according to the windowingmode value of the second task;
   sending the windowingmode value of the at least one second taskfragment to an application process of the target application;
   setting the windowingmode value of at least one first taskfragment in the first display configuration information to zero;
   obtaining a modified windowingmode value of the at least one first taskfragment by controlling the application process to modify the windowingmode value of the at least one first taskfragment set to zero according to the windowingmode value of a respective second taskfragment of the at least one second taskfragment; and
   determining the modified windowingmode value of the first task and the modified windowingmode value of the first taskfragment as the second display configuration information in the freeform window mode.

6. The method according to claim 5, wherein modifying the first display configuration information according to the freeform window mode further comprises:
   setting interface display information of the first display window in the activity-embedding mode to zero;
   determining interface display information of a display window corresponding to the modified windowingmode value of the first taskfragment according to the modified windowingmode value of the first taskfragment; and
   modifying the interface display information of the first display window set to zero according to the interface display information of the display window corresponding to the modified windowingmode value of the first taskfragment.

7. The method according to claim 6, wherein the interface display information comprises at least one of window display content information, window display size information, window display state information, a master-slave relationship between windows, or window display position information.

8. The method according to claim 3, further comprising:
determining that a display page of the target application is to be switched to the activity-embedding mode from the freeform window mode in response to an operation other than the dragging operation;
obtaining the first display configuration information by modifying the second display configuration information in the freeform window mode according to the activity-embedding mode; and
displaying the display page in the first display window in the activity-embedding mode according to the first display configuration information.

9. An electronic device, comprising:
at least one processor; and
a memory communicatively connected to the at least one processor and having stored therein instructions that are executable by the at least one processor;
wherein the instructions, when executed by the at least one processor, cause the at least one processor to:
in response to a dragging operation of a target sub-page, switch the target sub-page into a freeform window mode, wherein the target sub-page is from a plurality of sub-pages in a target application, and the target application is in an activity-embedding mode; and
determine at least one sub-page of the plurality of sub-pages other than the target sub-page as a background.

10. The electronic device according to claim 9, wherein the instructions, when executed by the at least one processor, cause the at least one processor to:
display the target sub-page in a display window in the freeform window mode based on display configuration information.

11. The electronic device according to claim 10, wherein the instructions, when executed by the at least one processor, cause the at least one processor to:
obtain first display configuration information of a first display window for displaying the target sub-page in the activity-embedding mode;
obtain second display configuration information in the freeform window mode by modifying the first display configuration information according to the freeform window mode; and
display the target sub-page in a second display window in the freeform window mode according to the second display configuration information.

12. The electronic device according to claim 11, wherein the instructions, when executed by the at least one processor, cause the at least one processor to:
obtain a windowingmode value of a first task and a windowingmode value of at least one first taskfragment of the first display window in the activity-embedding mode, wherein the windowingmode value of the first task is configured to indicate a display mode of the first display window, and the windowingmode value of the at least one first taskfragment is configured to indicate interface display information of the first display window corresponding to the activity-embedding mode; and
determine the windowingmode value of the first task and the windowingmode value of the at least one first taskfragment as the first display configuration information.

13. The electronic device according to claim 11, wherein the instructions, when executed by the at least one processor, cause the at least one processor to:
obtain a windowingmode value of a second task and a windowingmode value of at least one second taskfragment of the second display window in the freeform window mode;
obtain a modified windowingmode value of a first task by modifying the windowingmode value of the first task according to the windowingmode value of the second task;
send the windowingmode value of the at least one second taskfragment to an application process of the target application;
set the windowingmode value of at least one first taskfragment in the first display configuration information to zero;
obtain a modified windowingmode value of the at least one first taskfragment by controlling the application process to modify the windowingmode value of the at least one first taskfragment set to zero according to the windowingmode value of a respective second taskfragment of the at least one second taskfragment;
determine the modified windowingmode value of the first task and the modified windowingmode value of the first taskfragment as the second display configuration information in the freeform window mode.

14. The electronic device according to claim 13, wherein the instructions, when executed by the at least one processor, cause the at least one processor to:
set interface display information of the first display window in the activity-embedding mode to zero;
determine interface display information of a display window corresponding to the modified windowingmode value of the first taskfragment according to the modified windowingmode value of the first taskfragment; and
modify the interface display information of the first display window set to zero according to the interface display information of the display window corresponding to the modified windowingmode value of the first taskfragment.

15. The electronic device according to claim 11, wherein the instructions, when executed by the at least one processor, cause the at least one processor to:
determine that a display page of the target application is to be switched to the activity-embedding mode from the freeform window mode in response to an operation other than the dragging operation;
obtain the first display configuration information by modifying the second display configuration information in the freeform window mode according to the activity-embedding mode; and
display the display page in the first display window in the activity-embedding mode according to the first display configuration information.

16. A non-transitory computer-readable storage medium having stored therein computer instructions that, when executed by a computer, cause the computer to:
in response to a dragging operation of a target sub-page, switch the target sub-page into a freeform window mode, wherein the target sub-page is from a plurality of sub-pages in a target application, and the target application is in an activity-embedding mode; and
determine at least one sub-page of the plurality of sub-pages other than the target sub-page as a background.

17. The non-transitory computer-readable storage medium according to claim 16, wherein the instructions, when executed by the at least one processor, cause the at least one processor to:
display the target sub-page in a display window in the freeform window mode based on display configuration information.

18. The non-transitory computer-readable storage medium according to claim 17, wherein the instructions, when executed by the at least one processor, cause the at least one processor to:
obtain first display configuration information of a first display window for displaying the target sub-page in the activity-embedding mode;
obtain second display configuration information in the freeform window mode by modifying the first display configuration information according to the freeform window mode; and
display the target sub-page in a second display window in the freeform window mode according to the second display configuration information.

19. The non-transitory computer-readable storage medium according to claim 18, wherein the instructions, when executed by the at least one processor, cause the at least one processor to:
obtain a windowingmode value of a first task and a windowingmode value of at least one first taskfragment of the first display window in the activity-embedding mode, wherein the windowingmode value of the first task is configured to indicate a display mode of the first display window, and the windowingmode value of the at least one first taskfragment is configured to indicate interface display information of the first display window corresponding to the activity-embedding mode;
determine the windowingmode value of the first task and the windowingmode value of the at least one first taskfragment as the first display configuration information.

20. The non-transitory computer-readable storage medium according to claim 18, wherein the instructions, when executed by the at least one processor, cause the at least one processor to:
obtain a windowingmode value of a second task and a windowingmode value of at least one second taskfragment of the second display window in the freeform window mode;
obtain a modified windowingmode value of a first task by modifying the windowingmode value of the first task according to the windowingmode value of the second task;
send the windowingmode value of the at least one second taskfragment to an application process of the target application;
set the windowingmode value of at least one first taskfragment in the first display configuration information to zero;
obtain a modified windowingmode value of the at least one first taskfragment by controlling the application process to modify the windowingmode value of the at least one first taskfragment set to zero according to the windowingmode value of a respective second taskfragment of the at least one second taskfragment;
determine the modified windowingmode value of the first task and the modified windowingmode value of the first taskfragment as the second display configuration information in the freeform window mode.

* * * * *